Dec. 15, 1931.     W. W. HELLE     1,836,026
MIXING AND FORMING DEVICE
Filed April 12, 1930     2 Sheets-Sheet 1
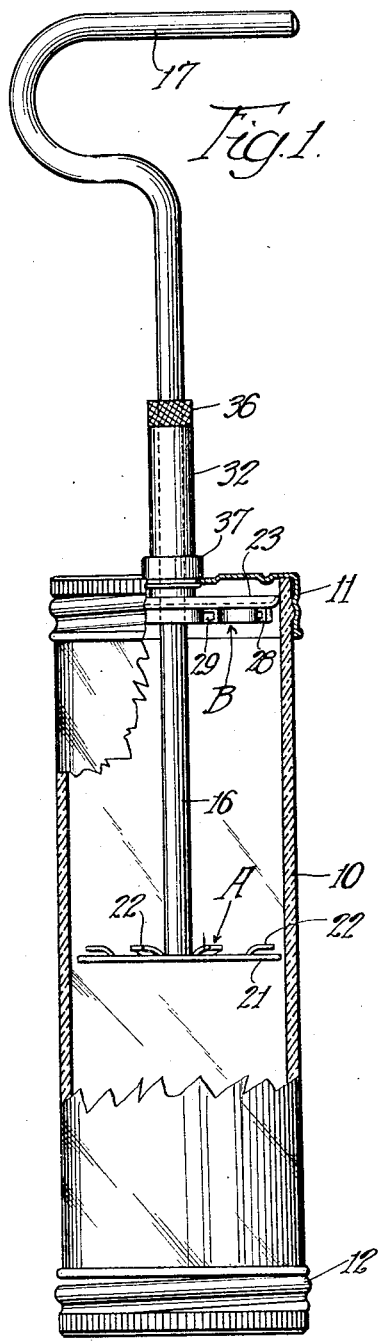
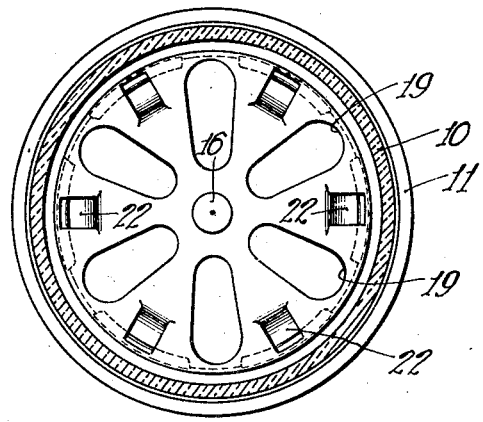
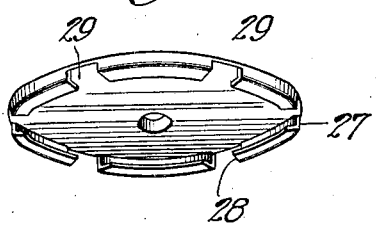
Inventor
Warren W. Helle
By George E. Mueller Atty.

Dec. 15, 1931.  W. W. HELLE  1,836,026
MIXING AND FORMING DEVICE
Filed April 12, 1930    2 Sheets-Sheet 2
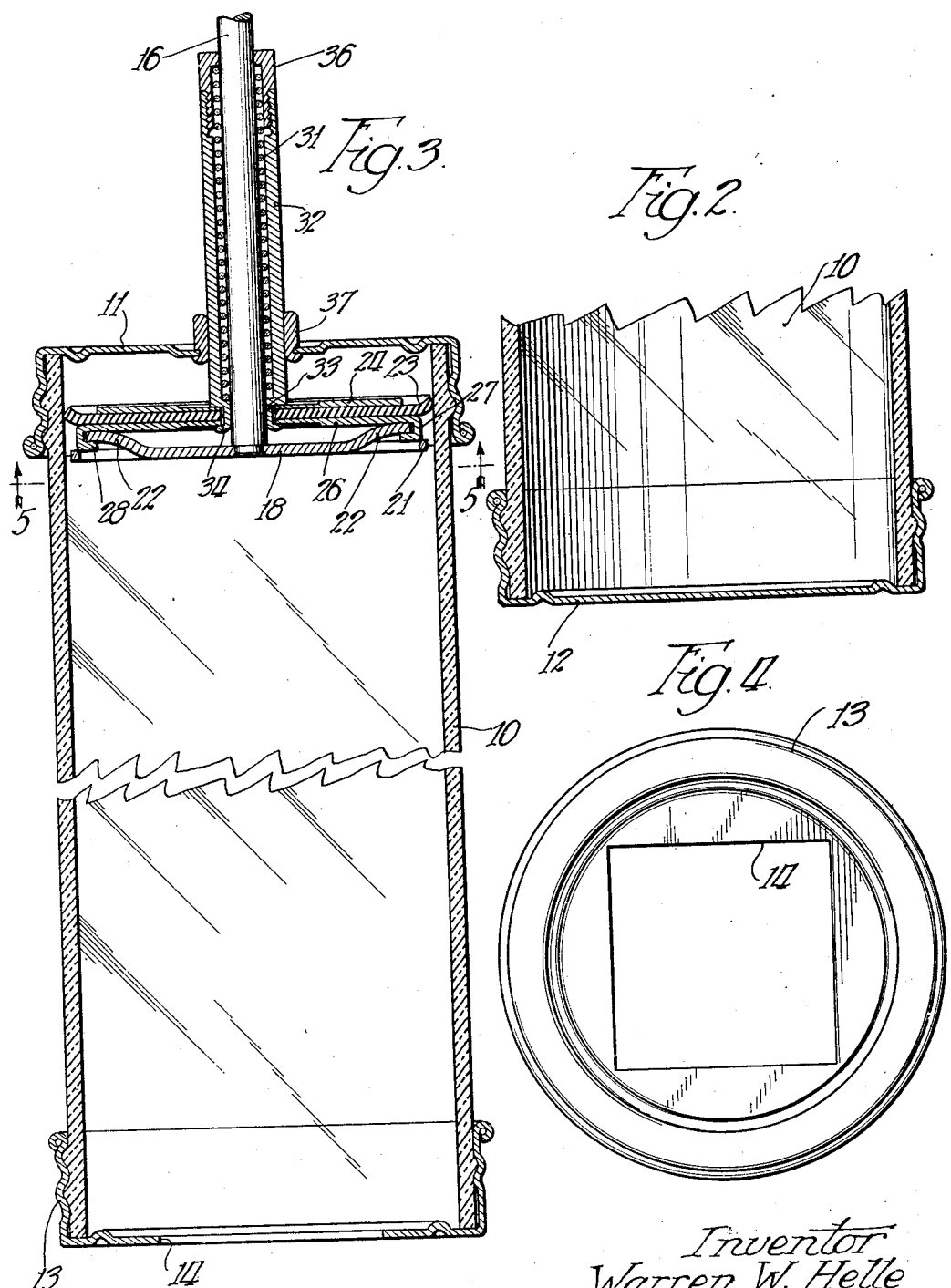
Inventor
Warren W. Helle
By George E. Mueller Atty.

Patented Dec. 15, 1931

1,836,026

UNITED STATES PATENT OFFICE

WARREN W. HELLE, OF HINSDALE, ILLINOIS, ASSIGNOR TO DURKEE-FAMOUS FOODS, INC., OF CHICAGO, ILLINOIS, A CORPORATION OF ILLINOIS

MIXING AND FORMING DEVICE

Application filed April 12, 1930. Serial No. 443,682.

My invention relates in general to mixing and forming devices. It relates more in particular to a small hand device adaptable for use by the ordinary housewife for mixing coloring matter with margarine or the like, and subsequently forming the resulting colored mixture into a rectangular block.

The principal object of the invention is the provision of a simple improved device of this character.

Another object is the provision of a device of this character which can be used with the maximum of cleanliness.

Another object is the provision of a device of this character which can be conveniently and quickly employed for the purposes set forth.

Other objects and features of the invention will be apparent from a consideration of the detailed description taken with the accompanying drawings, wherein, Fig. 1 is an elevational view partly in section, showing the position of the parts when a mixing operation is being performed, Fig. 2 is an enlarged sectional view showing one end cover, Fig. 3 is an enlarged fragmentary central sectional view showing the device in position for forming the butter after mixing, Fig. 4 is a bottom plan view of the forming cover, Fig. 5 is a transverse sectional view taken along the line 5—5 of Fig. 3 and looking upwardly at the mixing member, and, Fig. 6 is a sectional view showing a detail of the forming plunger.

In general, the device includes a container in which the material to be mixed is placed, with a mixing member, and a follower or plunger adapted to be secured to the mixing member to act as a plunger so that the material, after being mixed, can be extruded from one end of the container in the proper shape as determined by the outlet orifice thereof.

In the embodiment shown in the accompanying drawings, a glass container 10, of cylindrical or tubular shape is provided, in which the mixing operation takes place, the container being provided with an upper apertured cover 11, and a lower closed cover 12, used on the container when a mixing operation is being performed. A cover 13 (Fig. 4) is also provided having a forming aperture 14, this cover replacing the cover 12 when the margarine has been completely mixed and is ready to be formed to suitable shape. A mixing member A having certain novel features is provided together with a plunger or extruding member B. A handle 16 is used for operating either of the members A or B and projects through the central aperture in the upper cover and has a turned-over portion 17 forming a hand-piece.

As to the details of the mixing member, this is in the form of a flat disc 18 with radially disposed, elongated openings or slots 19—19, leaving a continuous peripheral edge 21. Between the openings 19 are a plurality of projections or lugs 22 designed to cooperate with portions of the follower B as will be hereinafter described, to interconnect the two members. These projections 22 are formed by partly excising portions of the disc and bending such portions up to a common plane parallel to, but above the major plane of the disc. This also provides openings between the elongated openings 19 which aid in the mixing of the margarine by passing some of this substance therethrough. As Fig. 3 shows, the handle is secured at the center of the disc so that the handle and mixing members are substantially integral.

The follower or extruding plunger includes a resilient disc-like member 23, preferably made of semi-soft rubber, and top and bottom plates 24 and 26 held together so as to grip the member 23 over a substantial portion of its area, leaving the edges free. The metal portion 26, shown more fully in Fig. 6, has downward extensions 27 with inturned flanges 28. A space 29 is provided between each downward projection, large enough to pass the projections 22. It then becomes possible to interconnect the mixing member A and the extruding plunger B, by pulling the mixing member up with the projections 22 through the openings 29, and then partially rotating the mixing member with respect to the plunger. Disconnection between the members is obtained by reversal of the process. Rubber disc 23 is made of ample diameter so as to compensate for irregularities in the diameter, etc., of the glass container.

Now I provide improved means for preventing seepage of material, specifically margarine, along the handle. Also, the same means will prevent dirt or foreign matter which may collect on the handle on the outside from entering and contaminating the margarine. In accordance with this provision, means is provided engaging the handle at a plurality of positions along its length so that it is successively cleaned by these several engaging points, and what material may pass one point will be trapped by the following point, and so on.

More specifically, the means includes a coil spring 31 fitting rather snugly against the handle and held in a casing 32 carried by the plunger assembly. This casing has a narrow portion 33 extending through an aperture in the plunger which is turned over at 34, thus securing the casing to the plunger and also holding the plunger parts in an assembled position. A screw threaded cap 36 functions to retain the spring within the casing 32, but permits withdrawal of the spring for cleaning purposes and the like. A specific advantage of the spring in this connection is that it can be withdrawn easily from the handle, leaving ample room for cleaning. A collar 37 surrounds the casing 32 and is turned over in the aperture in the top cover, and so held in place therein. This affords ample supporting surface for the casing to maintain the parts in vertical alignment at all times, and aids in the prevention of material passing into or out of the container at this point.

In the operation of the device, the cover 12 is placed on the lower end, and cover 11 removed, with the handle, mixing member and plunger. Margarine is then placed, preferably in somewhat comminuted form within the container, and the necessary coloring matter added. The whole top assembly is then placed on the container, with the cover 11 screwed down tightly in place. The plunger is left in its upward position as shown in Fig. 1, and the mixing member is then reciprocated until a thorough mixing of the margarine and coloring matter has been obtained. At this point the plunger is engaged by the projections 22 in the manner described, and the cover 12 is replaced by the forming cover 13. Then by continued gentle pressure on the handle, the margarine is forced out through the opening 14, assuming the shape of the opening, or rectangular in the present showing.

Attention is directed to the fact that the margarine can be entirely mixed and formed in a very few minutes, and without the necessity of touching it with the hands when changing from one type of tool to another, or in fact, doing anything except to operate the device, by holding the container in one hand and the handle in the other. When the cover 12 is removed it is substantially free from margarine, and there is very little, if any waste, except such as adheres around the mixing member.

The device has been explained in detail as connected with the handling of margarine. It is obvious however, that it may be used for other purposes, and the construction thereof may be considerably modified. For this reason, I do not restrict myself to any of the structural details shown or described, the invention being limited only by the scope of the appended claims.

What I claim is new and desire to protect by Letters Patent of the United States, is:

1. A device for mixing coloring matter with margarine comprising a cylindrical container, a top for the container with a central opening therein, a cover for the opposite end of the container, a reciprocable mixing member having an operating handle extending through said central opening, a plunger for forming the margarine, and responsive to the turning of the operating handle means for quickly, operably attaching the handle to the plunger within the container.

2. A device of the character described, comprising a cylindrical container, a cover provided with a forming aperture for one end of the container, an imperforate cover adapted to be interchanged with said apertured cover for use during mixing, a mixing member having an operating handle, a top cover with a central opening for the passage of said handle, a plunger aperture for the passage of said handle therethrough to permit operation of the mixing member independent of said plunger, and means rendered effective by turning said operating handle for connecting said mixing member to the plunger whereby to extrude mixed material from said container through the forming aperture in said first mentioned cover.

3. A device as set forth in claim 2, wherein said mixing member has a plurality of projections, and said plunger is provided with a plurality of lugs under which said projections are adapted to engage, whereby the mixing member can be attached to the plunger for operation of the plunger by the handle of said mixing member.

4. In a device for mixing coloring matter with margarine, a cylindrical container provided with end covers, a mixing member adapted for reciprocation longitudinally of the container, a handle secured to the mixing member and extending axially through an aperture in one of said covers, a plunger apertured to pass said handle and disposed in the container behind the mixing member, means for interconnecting the mixing member and plunger, and a coil spring carried by the plunger and engaging along a substantial portion of the length of the handle for preventing seepage of material along said handle.

5. In a device for mixing coloring matter with margarine, a cylindrical container, a mixing member therein, a handle for the mixing member, a plunger through which said handle passes, a narrow cylindrical casing carried by the plunger through which said handle passes, and a coil spring housed in said casing and disposed around the handle for preventing seepage of material along said handle.

6. In a device for mixing coloring matter with margarine, a cylindrical container with end covers, a mixing member therein, a handle for the mixing member extending axially through an aperture in one of said covers, a plunger between the apertured cover and the mixing member apertured to pass the handle, means for interconnecting the mixing member and plunger, a coil spring with a plurality of helices extending around the handle and contacting therewith, and a casing for the spring carried by the plunger, whereby said spring is maintained stationary during movement of the mixing member alone to keep the handle clean during the mixing operation.

7. In a device for mixing coloring matter with margarine, a cylindrical container with end covers, a mixing member therein, a handle for the mixing member extending axially through an aperture in one of said covers, a plunger between the apertured cover and the mixing member apertured to pass the handle, means for interconnecting the mixing member and plunger, a coil spring with a plurality of helices extending around the handle and contacting therewith, a casing for the spring carried by the plunger, whereby said spring is maintained stationary during movement of the mixing member alone, said spring casing having a removable cover permitting extraction of the spring for cleaning purposes and the like.

8. In a device for mixing coloring matter with margarine, a cylindrical container having end covers, a mixing member including a flat disc having radially disposed elongated openings therein, a plurality of projections disposed in a separate plane from that of the disc, one projection between each pair of openings, a plunger having means cooperating with said projections for interconnecting said mixing member and plunger, and a handle secured to the center of the disc and extending through axial apertures in the plunger and adjacent end cover.

9. A device of the character described, comprising a cylindrical container, a mixing member in the form of a flat disc having a continuous unbroken periphery, elongated radial slots, and radially disposed projections upturned from the material of the disc, an operating handle secured to the mixing member centrally thereof, and a plunger comprising a pair of flat metal plates secured together on opposite sides of a rubber disc that at least equals in diameter the inside of the container, and downturned projections formed from the material of the plunger plate adjacent the mixing member, said mixing member and said plunger being adapted to be inter-connected by interconnecting said projections thereon.

In witness whereof I hereunto subscribe my name this 6th day of March, 1930.

WARREN W. HELLE.